Jan. 3, 1967 ATSUSI TOMOZAWA 3,296,612

CONVERTER FOR CONVERSION BETWEEN ANALOGUE AND DIGITAL SIGNAL

Filed Oct. 18, 1963

Inventor
ATSUSI TOMOZAWA

By [signature]
Attorney 3,296,612

CONVERTER FOR CONVERSION BETWEEN ANALOGUE AND DIGITAL SIGNAL

Atsusi Tomozawa, Tokyo, Japan, assignor to Nippon Electric Company, Limited, Tokyo, Japan, a corporation of Japan Filed Oct. 18, 1963, Ser. No. 317,227
Claims priority, application Japan, Nov. 13, 1962, 37/51,205
2 Claims. (Cl. 340—347)

This invention relates to a converter based on the delta modulation principles, for conversion between analogue and digital signals, such as used in a time-division multiplex communication apparatus, a digital information transmission apparatus, a digital information storing apparatus, an electronic computer, or the like, and more particularly to an encoding device for converting in compliance with the principles of the delta modulation the variations of analogue signals into time-division multiplexed digital signals and to a decoding device for decoding such digital signals into a plurality of analogue signals.

In case there is only one channel of analogue signal which is to be converted into digital signal for transmission, then the object of the delta modulation can fully be attained by means of a communication apparatus comprising an encoding and a decoding device based on basic and primitive delta modulation. In case there are a plurality of channels, however, such an apparatus in which the primitive delta modulation is resorted to is insufficient. Two principal types have been proposed for a time-division multiplexed delta-modulation communication system for intertransmitting by converting on the sending side the respective variations of analogue signals of a plurality of channels into time-division multiplexed digital signals and by converting on the receiving side the digital signals into the replicas of the original analogue signals. To say of the encoding devices on the sending side only, one of the types is so designed that the analogue signals of a plurality of channels to be multiplexed are encoded by means of encoders, respectively, which perform primitive delta modulation and which are provided for the respective channels and then multiplexed in the manner of time division.

The other is so composed that the analogue signals of a plurality of channels may successively be compared with the respective analogue signals of a frame of multiplexing before, and the variations may thereafter be encoded. The encoding device of the latter type comprises a comparator having a first input terminal for receiving sampled analogue signals and a second input terminal for receiving for comparison therewith reference voltages assigned to the respective analogue signals, and adapted to deliver to an output terminal, digital codes which represent the results of comparison; a local decoder for decoding the digital codes; an analogue adder having a first input terminal for receiving decoded voltage from the local decoder and a second input terminal for receiving the reference voltage and adapted to deliver to an output terminal an analogue sum of the two input signals; and a memory device for memorizing the output analogue signal of the analogue adder for a time interval substantially corresponding to a frame of the multiplexing to supply the memorized signals to the second input terminal as the reference voltages.

With the arrangement according to the former type, crosstalk seldom occurs among the multiplexed channels. In case the number of channels to be multiplexed is large, however, necessity of an encoder in each channel results in an excessively bulky apparatus, which is not practicable.

With the arrangement of the latter type, the above-mentioned defects of the former type are removed, while crosstalk increases with increase in the number of the channels because the memory during the frame period is performed in the form of the analogue signal. The crosstalk may be reduced to some extent by improving the quality of memory elements used in the analogue signal memory device. Yet the allowable number of the channels has restrictions, with the result that the arrangement of the latter type also is impracticable in case the number of the channels is large.

Although the encoding devices alone have been considered in the above, such also holds true as regards the decoding devices.

An object of the invention is therefore to provide a converter for conversion between analogue and digital signals according to the delta modulation principles, which has as few components as possible and has very little fear of crosstalk, particularly applicable to a time-division multiplex delta-modulation communication apparatus.

The encoding device of this invention comprises a time-division multiplex delta-modulation communication apparatus with components similar to the device of the above-mentioned latter type, except the unique construction whereby the memory stores the previous signal amplitude in the form of digital signals during a frame period. More particularly, the communication apparatus of the invention comprises at the transmitter end an encoding device wherein analogue signals supplied for encoding from a plurality of channels are successively sampled, each of the sampled analogue signals is memorized in the form of a digital signal during a frame period, and the digital signal is modified in accordance with the afore-mentioned results of comparison for further memorizing during the succeeding frame period, and at the receiver end, a decoding device wherein the memory is performed also in the form of digital signals.

Now a time-division multiplex delta-modulation communication apparatus according to the invention will be explained with reference to the accompanying drawings, in which.

Figures 1, 2, 3, 4:
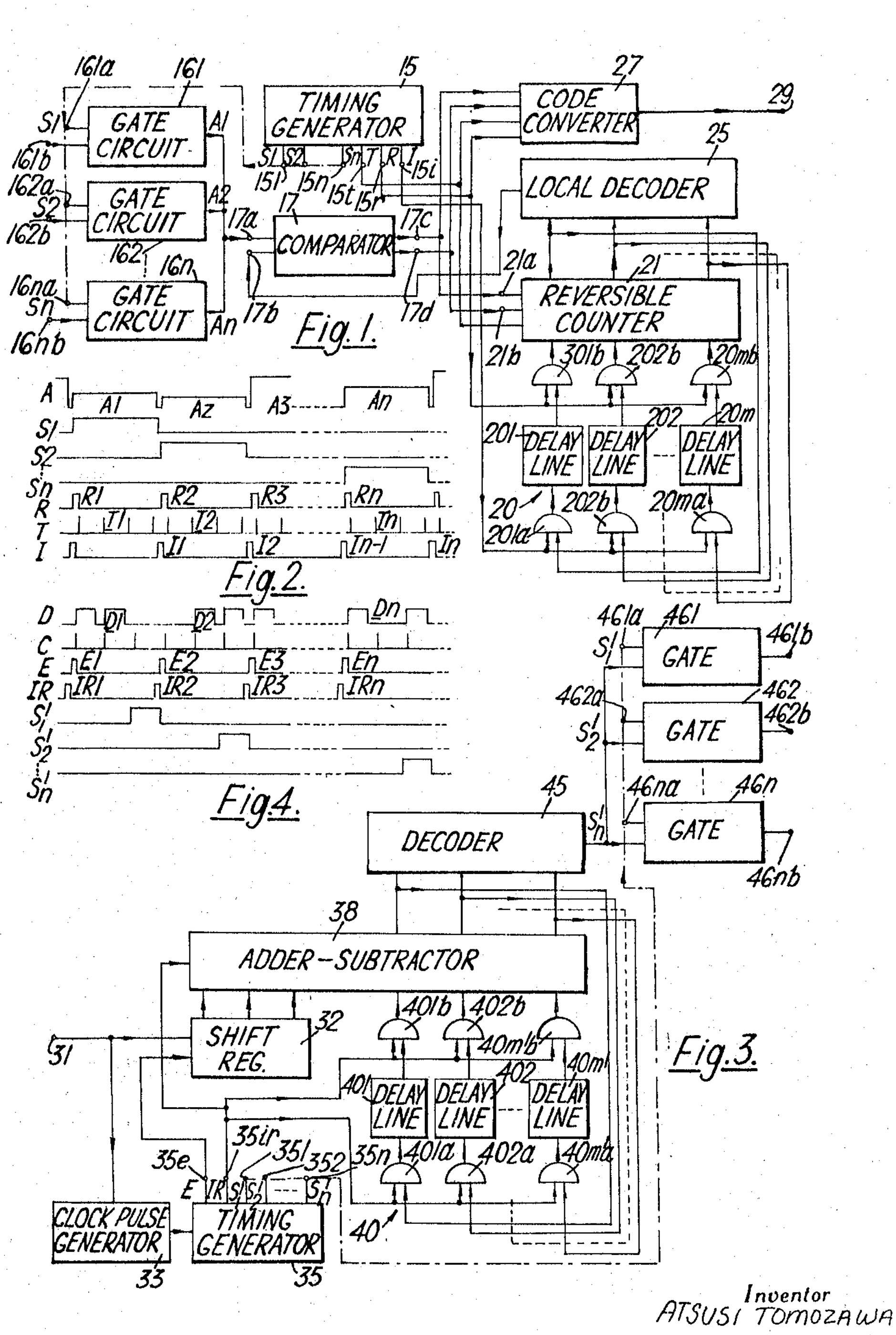
FIG. 1 is a block diagram of an encoding device on the sending side of an embodiment of the invention.
FIG. 2 shows waveforms at several points in the encoding device.
FIG. 3 is a block diagram of a decoding device on the receiving side.
FIG. 4 shows waveforms at several points in the decoding device.

Referring specifically to FIG. 1, an encoding device 10 of the communication apparatus according to the invention comprises a timing signal generator 15 which produces at sampling time pulse output terminals **151–15*n* a plurality of sampling time pulse trains $S_1$–$S_n$ corresponding in number to the number $n$ of the channels to be multiplexed, respectively, (FIG. 2) at a reading pulse output terminal 15*r* a reading pulse train R consisting of recurring reading pulses $R_1$–$R_n$ corresponding in time to the sampling time pulses $S_1$–$S_n$, respectively, at a writing pulse output terminal 15*i* a writing pulse train I similarly consisting of recurring writing pulses $I_1$–$I_n$, and at a triggering pulse output terminal 15*t* a triggering pulse train T similarly consisting of recurring triggering pulses $T_1$–$T_n$. Gate circuits 161–16*n* will cyclically gate in response to the sampling time pulse trains $S_1$–$S_n$ supplied at timing pulse input terminals 161*a*–16*na* thereof, respectively, the analogue signals which are to be transmitted and are also supplied at information signal input terminals 161*b*–16*nb* thereof, respectively, to produce an information pulse series A, a frame of which consists of pulse-amplitude-modulated (PAM) information pulses $A_1$, $A_2$, . . . , and $A_n$, $n$ in number, (FIG. 2) and which is supplied to a first input terminal 17*a* of a comparator 17. For simplicity, operation of the encoding device 10 will at first be explained in conjunction with a first information pulse $A_1$ alone in the information pulse series A. At the time of application of the information pulse $A_1$ or more particularly in synchronism with the leading edge of the pulse $A_1$, appears that reading pulse $R_1$ which is assigned to the information pulse $A_1$, to be applied to a digital memory device 20 comprising delay-line memory elements 201–20***m* which are equal in number to the number *m* of the digits of a digital signal to be memorized and connected in parallel, input AND gates 201*a*–20*ma* connected to the input ends of the respective elements 201–20*m*, and output AND gates 201*b*–20*mb* connected to the output ends of the respective elements 201–20*m*, at all of the output AND gates 201*b*–20*mb*. The digital memory device 20 is so composed, as will later become more clear, that at the time point of occurrence of the reading pulse $R_1$ a digital signal or *m* digit code elements representing an analogue value of the analogue signal of a frame period prior to the information pulse $A_1$ may simultaneously appear at the output ends of the memory elements 201–20*m* if the difference between each set of the quantization levels of the respective analogue values is in an ideal case, namely, within a predetermined range of $\pm 4$ levels or eight level intervals, for example. As a result, it follows that by the gating function of the output AND gates 201*b*–20*mb* caused by the reading pulse $R_1$, these digit code elements are simultaneously applied as the set inputs to and stored in the corresponding bistable circuits of a reversible counter 21 comprising *m* stages of bistable circuits. Inasmuch as there is no memory in the memory device 20 immediately after initiation of transmission, it is impossible to obtain in the above-described manner the digit code elements representing the analogue value of a frame period prior to the information pulse $A_1$. In several frame periods after the beginning of transmission, the memory will be in the aforementioned ideal case the digit code elements representing the analogue value of frame period prior to the information pulse $A_1$. The transient time of the several frame periods is very short compared with the whole time of transmission and can be neglected. The digit code elements stored in the reversible counter 21 are at once decoded by a local decoder 25, and the decoded output is delivered as the reference voltage to the comparator 17 at a second input terminal 17*b*. The comparator 17 operates in response to the inputs supplied to the two input terminals 17*a* and 17*b* to deliver at a first and a second output terminal 17*c* and 17*d*, conjugate output voltages representing a result of comparison. The conjugate output voltages may consist, when the voltage of the information pulse $A_1$ supplied to the first input terminal 17*a* of the comparator 17 is not less than the reference voltage applied to the second input terminal 17*b*, of a positive finite output from the first output terminal 17*c* and of an infinitesimal output from the second output terminal 17*d* and, when the former is less than the latter, of a combination of the reversed outputs. These output voltages derived from the output terminals 17*c* and 17*d* are supplied to the reversible counter 21 as the add-or-subtract input terminals 21*a* and 21*b*. Immediately after the add-or-subtract inputs are supplied to the counter 21, a triggering pulse series $T_1$ consisting of triggering pulses, the number, four in the instant case, of which determines the number of the levels for the above-mentioned predetermined range, begins to trigger the counter 21 to increase by one, when the output voltage from the first output terminal 17*c* is finite, and to reduce by one, when the output voltage from the second output terminal 17*d* is finite, the stored content of the counter 21 at each of the triggering pulses $T_1$. Thus, the reference voltage which is the output of the local decoder 25 approaches the analogue value of the information pulse $A_1$ and in the above-mentioned ideal case, the output code elements of the counter 21 at the time of the last one of the triggering pulses $T_1$ become *m*-digit digit code elements corresponding to the analogue value of the information pulse $A_1$. At this moment a writing pulse $I_1$ is delivered to all of the input AND gates 201*a*–20*ma* to transfer the digit code elements from the reversible counter 21 to the delay-line memory elements 201–20*m*, respectively, which in turn will transmit the supplied digital code elements to the respective output ends, in a frame period. At the output terminals 17*c* and 17*d* of the comparator 17, there appears a comparison output or a kind of digital signal composed of a combination of pulses representing the increase or decrease of the quantization level of the information pulse $A_1$ as compared with that of the analogue value of a frame period prior to the pulse $A_1$. Such operation is repeated for each of the information pulses $A_2, A_3, \ldots,$ and $A_n$ of the information pulse trains A to successively provide at the output terminals 17*c* and 17*d* of the comparator 17 comparison outputs for the respective information pulses $A_1, A_2, \ldots,$ and $A_n$.

Although the comparison outputs may be used by themselves for transmission through a transmission line as the time-division multiplexed delta-modulation signals, it is preferable in order to reduce the bandwidth of such signals in the transmission line, to use a code converter 27 which comprises three-stage bistable circuits arranged in a similar manner as the reversible counter 21 and adapted to convert the above-mentioned eight intervals into binary codes of from 000 to 111 under control of the comparison outputs and the triggering and the reading pulse trains T and R. The code converter 27 operates like the counter 21, being reset to a state wherein the stored code word is such that in response to each reading pulse $R_1, R_2, \ldots,$ and $R_n$ it represents the fact that there is no difference between the two inputs to the comparator 17. The converter is thereafter triggered by the successive four triggering pulses appearing within the time interval required for encoding of the analogue signal of a channel following each of the reading pulses $R_1, R_2, \ldots,$ and $R_n$. Consequently, the code converter 27 stores at the last time point of each of the triggering pulse series $T_1$–$T_n$, digit code elements representing the variation of the state in the reversible counter 21. It is therefore possible by successively sending out the digit code elements stored in the code converter 27 to an output terminal 29, to to provide the desired time-division multiplexed delta-modulation signals which have been converted so as not to occupy an unnecessarily broad band.

In the above-explained embodiment, four triggering pulses are produced for each channel. The embodiment may be modified in such a manner that only one triggering pulse may be produced for each channel as in the usual primitive delta-modulation equipment so that the state in the reversible counter 21 may vary at most by plus or minus one. In this case either one of the comparison outputs from a pair of output terminals 17*c* and 17*d* of the comparator 17 can be used by itself as the time-division multiplexed delta-modulation signal, without the code converter 27.

Among the components of the encoding device 10, the timing pulse generator 15 may be composed in the known manner of a frequency-stabilized pulse generator having a preselected repetition frequency, and associated bistable circuits, delay elements, logical circuits, and the like. The number *m* of the stages of the bistable circuits or the storing elements of the reversible counter 21 may be selected in consideration of the foreseen magnitude of amplitude variation of the input analogue signals or the required precision or the reliability of reproducibility of the analogue signal. The delay-line memory elements 201–20*m* may each be of the type that which is described in Electrical Communications, vol. 28, 1951, pages 46–53. Inasmuch as this type of memory element can give the delay of about 0.5 ms. to a pulse train whose repetition frequency is 2 mc., the number of bits of the digital signal which can be memorized is about one thousand and the number of channels which can be multiplexed is as large as the order of 1000÷$n$. Furthermore, the memory element which contains magnetic material is sufficiently small and light that use of a large number of the elements will hardly increase the volume of the whole apparatus. Each of the comparator 17 and the local decoder 25 may be a conventional one. If such nonlinear delta-modulation is desired as may result from nonlinear decoding, the local decoder 25 may be any one of the decoding circuits with nonlinear quantization.

Referring to FIGS. 3 and 4, a decoding device 30 of the invention on the receiving side will now be explained. In the decoding device 30 shown in block in FIG. 3, signal pulses $D_1$, $D_2$ . . . , and $D_n$ of an input time-division multiplexed delta-modulation signal pulse train D (FIG. 4) whose distortion in wave forms caused by unfavourable conditions of a long transmission line has been reshaped at a shaping circuit not shown, are supplied from an input terminal 31 to a shift register 32 as the triggering input thereof and to a clock pulse generator 33 to cause the same to produce a clock pulse train C whose repetition frequency is the same as that of the signal pulse train D. A receiving-side timing signal generator 35, when supplied with the clock pulse train C (FIG. 4), produces at a reset pulse output terminal 35*e* a reset pulse train E, consisting of reset pulses $E_1$, $E_2$, . . . , and $E_n$, at a writing-reading pulse output terminal $\mathbf{35}_{ir}$ a writing-reading pulse trains IR consisting of writing-reading pulses $IR_1$, $IR_2$, . . . , and $IR_n$, and at output channel separating timing pulse output terminals 351–35*n* a plurality of timing pulse trains $S'_1$–$S'_n$. The shift register 32 comprises bistable circuits whose stages correspond in number to the number, in the instant case, three, of the bits of pulses constituting each of the signal pulses $D_1$, $D_2$, . . . , and $D_n$. For simplicity, operation of the decoding device 30 will at first be explained, as was the case with the encoding device 10, in conjunction with a signal pulse $D_1$ in the signal pulse train D. By a reset pulse $E_1$ which appears just before the input terminal 31 is supplied with the first one of the three-bit pulses of the signal pulse $D_1$, the shift register 32 is reset to store the signal pulse $D_1$ in the correct stages. When the last-bit pulse of the signal pulse $D_1$ is supplied to the shift register 32, the pulses stored therein are all supplied as the set inputs to three-stage bistable circuits, respectively, of an adder-subtractor 38 which further comprises $m'$ stages of bistable circuits. A writing-reading pulse $IR_1$ produced slightly prior to the reset pulse $E_1$, is also supplied to the adder-subtractor 38 to reset the same and also to a memory device 40 comprising a plurality of delay-line memory elements 401–40*m'* disposed in parallel relation to one another, input AND gates 401*a*–40*m'a* connected to the input ends of the respective elements 401–40*m'*, and output AND gates 401*b*–40*m'b* connected to the output ends of the respective elements 401–40*m'*, at all of the output AND gates 401*b*–40*m'b* to simultaneously gate the same. Inasmuch as the construction of the memory device 40 is such that at the time point of the gating operation, digital code elements representing such an analogue value of the channel comprising the signal pulse $D_1$ as has appeared a frame period before may simultaneously appear at the output ends of the memory elements 401–40*m'*, respectively, the gating operation supplies the digital code elements simultaneously to the respective stages of the bistable circuits in the added-subtractor 38 as the set inputs to be stored therein. The digital value of the signal pulse $D_1$ supplied from the shift register 32 to the added-subtractor 38 which has thus become ready for acceptance of the signal pulse $D_1$, is added to or subtracted from, at the adder-subtractor 38, the digital value which represents the analogue value of a frame period before and which have already been stored in the adder-subtractor 38. The output code elements of the respective stages of the bistable circuits of the added-subtractor 38 which represent the result of addition or subtraction are now decoded at a decoder 45 to become an analogue signal, which is supplied to all of channel separating output gates 461–46*n* at respective ones of input terminals and is gated by such a timing pulse $S_1'$ as may be supplied at that moment to a timing signal input terminal 461*a* to appear at corresponding output terminal 461*b*. The output digital code elements of the adder-subtractor 38, while delivered to the decoder 45, are also sent towards the memory device 40 through the respective input AND gates 401*a*–40*m'a* and are applied to the memory device 40 by the gating action of the input AND gates 401*a*–40*m'a* caused by the writing-reading pulse $IR_2$ to reach the output AND gates 401*b*–40*m'b* a frame period later. The above-described operation recurs for each of the signal pulses $D_2$, $D_3$, . . . , $D_n$ succeeding the signal pulse $D_1$ to produce the desired output analogue signals at output terminals 461*b*–46*nb*.

In the above-explained decoding device 30, the adder-subtractor 38 will not be explained any further because such may be one that is described by R. K. Richard in "Arithmetic Operations in Digital Computers," chapter 4, published in 1955 by D. van Nostrand. Alternatively, the adder-subtractor 38 may be composed of a reversible counter like that in the encoding device 10 on the sending side, if the time required for the decoding operation may not be so short, with some necessary modifications of the circuitry associated with the adder-subtractor 38. The construction and operation of the memory device 40 are almost the same as those of the memory device 20 and differ from the latter in that the writing-reading pulse series IR opens all of the input and output AND gates 401*a*–40*m'a* and 401*b*–40*m'b*. The number $m'$ of the memory elements in the memory device 40 which may be determined independently of the number $m$ of the memory elements of the memory device 20 must be selected with considerations mentioned in connection with the memory device 20 and preferably are made equal to the number $m$.

As has been explained, the comparison voltage is memorized during a frame period of the multiplexed channels with the communication apparatus of the invention, not in the form of analogue value but of digital value, whereby crosstalk between the channels is scarcely caused in spite of the face that the comparator 17, the reversible counter 21, the local decoder 25, and the memory device 20 in the encoding device 10 on the sending side and the adder-subtractor 38, the decoder 45, and the memory device 40 in the decoding device 30 on the receiving side are common to all the multiplexed channels. Furthermore, it consequently becomes possible to provide sufficient capacity with small-sized delay-line memory elements having relatively small capacity.

Although the invention has so far been described in conjunction with a time-division multiplex communication apparatus, the invention is generally applicable to a device for converting analogue signals into digital signals and to a device for converting digital signals into analogue signals. It is therefore to be noted that such technical terms as "channels" used herein and in the appended claims for patent should be understood in their broadest senses. It is also to be understood that the information pulse series transmitted after encoded by the encoding device 10 provided on the sending side according to the invention may be decoded not by the decodng device 30 but instead by a conventional decoding device and that the sending side alone may conversely be composed of a conventional encoding device. Furthermore, the number of bits which will constitute one of the channels of the time-division multiplex delta-modulation pulse series D, may be selected at will. If the sampling period in the encoding device 10 on the sending side is short enough as compared with the period of variation of the input analogue signals, then the delay time of each delay-line memory element in the digital memory devices 20 and 40 may not be a frame period of the multiplexing but may be several frame periods.

As will be understood from the above description, the patent right allowed to the application covers all sorts of a device for converting analogue signals into digital signals or vice versa as claimed in the following claims for patent.

What is claimed is:

1. A device for converting analogue signals of a plurality of channels into time-division multiplex delta-modulation digital signals, comprising sampling means for sampling said analogue signals at successively displaced time positions and in cyclic order for said channels into an amplitude-modulated pulse series; a comparator for comparing one of said amplitude-modulated pulse series as a first input signal with a second input signal to produce a resultant output signal; a reversible counter composed of a plurality of bistable circuit stages, means for applying said output signal to said counter as a first input, with such set inputs as second inputs as may be supplied to the respective ones of said bistable circuit stages, and with such triggering pulses as third inputs as may cause stepping of said bistable circuit stages, and adapted to add or subtract the number of the triggering pulses to or from the digital value represented by said second inputs in accordance with the value of said first input; a local decoder connected to every one of said bistable circuit stages so as to produce a signal representative of an analogue quantity corresponding to the digital quantity represented by the outputs of said bistable circuits stages and to deliver the produced signal to said comparator as said second input signal; a digital memory device having memory elements which are connected in addition to said local decoder across the respective bistable circuit stages, and adapted to deliver said digital value represented by said outputs of said bistable circuit stages back to the same as said second inputs at a time point of at least a frame of the sampling operation of said sampling means; and means for producing a pulse series constituting a digital signal from said output signal of said comparator.

2. A device for converting time-division multiplex delta-modulation digital signals obtained by time-division multiplexing and delta-modulating analogue signals of a plurality of channels, into the replicas of the original analogue signals, comprising a shift register having a first number of bistable circuit stages corresponding to the number of digits of a code word composed of individual pulses in a pulse series of said digital signals, for simultaneously producing in response to said code word digital signals constituting said code word at the last bit position of said code word; an adder-subtractor composed of a second number of bistable circuit stages, supplied with the outputs of said shift register as first inputs, with set inputs to said bistable circuit stages of said second number as second inputs, and adapted to add to or subtract from a digital quantity represented by said second inputs another digital quantity represented by said first inputs; a decoder connected to said bistable circuit stages of said adder-subtractor for producing an analogue signal corresponding to the digital quantity given by the outputs of such bistable circuit stages; a digital memory device having digital memory elements connected in addition to said decoder across said bistable circuit stages of said adder-subtractor, respectively, and adapted to deliver said digital quantity given by the outputs of such bistable circuit stages back to said stages as said second inputs at a time point of at least a frame period of multiplexing of said channels later; and channel separating output gates for distributing the signals produced by said decoder to said channels.

References Cited by the Examiner

UNITED STATES PATENTS

| | | | |
|---|---|---|---|
| 2,775,727 | 12/1956 | Kernahan et al. ------ | 318—28 |
| 2,865,564 | 12/1958 | Kaiser et al. --------- | 235—61 |
| 3,211,976 | 10/1965 | Brule et al. ---------- | 318—28 |

MAYNARD R. WILBUR, *Primary Examiner.*

DARYL W. COOK, *Examiner.*

A. L. NEWMAN, *Assistant Examiner.*